UNITED STATES PATENT OFFICE.

HARMEN W. KNOTTENBELT, OF THE HAGUE, NETHERLANDS.

MANUFACTURE OF FUEL FOR EXPLOSION-MOTORS OR OTHER COMBUSTION-ENGINES.

1,317,582. Specification of Letters Patent. Patented Sept. 30, 1919.

No Drawing. Application filed May 12, 1919. Serial No. 296,672.

*To all whom it may concern:*

Be it known that I, HARMEN WILLEM KNOTTENBELT, subject of the Queen of the Netherlands, residing at The Hague, Kingdom of the Netherlands, have invented certain new and useful Improvements in the Manufacture of Fuel for Explosion-Motors or other Combustion-Engines; and I do hereby declare the following to be a full, clear, and exact description of the invention, such as will enable others skilled in the art to which it appertains to make and use the same.

This invention relates to processes of manufacturing fuel for explosion motors and combustion engines generally from liquid fuels obtainable in the trade containing a hydrocarbon or mixtures of hydrocarbons. It has been repeatedly proposed heretofore to manufacture petrol substitutes by treatment of liquid fuels of the character referred to. One such proposed process consisted in treating suitable hydrocarbons with sulfuric acid at 66° Bé., or with fuming sulfuric acid, and subsequently adding a solution of ordinary soda (sodium carbonate) or a solution of caustic soda (sodium hydroxid) to neutralize the resultant treated hydrocarbons.

Such methods of the prior art have the disadvantage that the oils produced show a detrimental alkalinity. They contain, in addition to sulfates and chlorids, composites of alkaline reaction, for instance hydroxids, which cannot be removed even by repeated washings with water. The presence of said composites is disadvantageous for the reason that, when the liquids are employed as fuel in connection with explosion motors and combustion engines generally, even small quantities of said composites attack the iron and steel parts of said motors or engines by oxidation, resulting in clogging or fouling the cylinder or associated parts thereof, such as the valves, ignition plugs, piston faces, etc.

The presence of these composites or bodies of alkaline reaction in motor fuels of the character described as produced by processes of the prior art, is due to the formation of certain chemical compounds, more especially by reason of the presence of hydroxyl ions (OH) which, as is well known, are characteristic of alkalinity, and which are chiefly present in the neutralizing solution. The use of carbonate of soda in place of caustic soda, which has been repeatedly tried, has yielded no better or practical results for the reason that the presence of hydroxyl ions in the neutralizing solution cannot thereby be avoided because ordinary soda partly hydrolyzes in aqueous solution; in other words, it is decomposed into the relatively weak acid, carbonic acid, and the relatively strong base, sodium hydroxid, according to the equation:

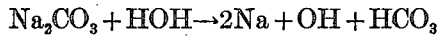
$$Na_2CO_3 + HOH \rightarrow 2Na + OH + HCO_3$$

As a result, an aqueous solution of sodium carbonate, exhibits much the same properties as a solution of caustic soda of corresponding dilution; that is, it imparts a red color to a solution of phenolthalein, indicating the presence of hydroxyl ions.

The principal object of the present invention is to avoid the difficulties and disadvantages characterizing the processes heretofore proposed, and to attain advantages not realized heretofore, by carrying out the refining treatment in such a way as to prevent the formation of bodies of alkaline reaction in the liquid to be employed as motor or engine fuel, and more particularly by avoiding the formation and presence of hydoxyl ions in the neutralizing stage of the treatment.

In carrying out my novel method in practice, the neutralization of the hydrocarbon liquid after its treatment with sulfuric acid is effected by the use of antacid substances, aqueous solutions of which are not hydrolyzed; the neutralization of the residual sulfuric acid or other acid bodies present in the treated hydrocarbon liquid being thus effected in the absence of hydroxyl ions. For this purpose, in accordance with my invention, I have found it particularly desirable to employ a solution or suspension of bicarbonate of soda, preferably chemically pure, in place of the ordinary normal carbonate of soda or caustic soda heretofore used. For example, in preparing a motor fuel from a suitable liquid hydrocarbon or mixture of hydrocarbons, the liquid is first treated in the usual manner with common strong sulfuric acid or with fuming sulfuric acid, and is thereafter neutralized with an aqueous solution or suspension of chemically pure bicarbonate of soda which may be applied at any temperature. In a specific example, the liquid hydrocarbon treated may be commercial benzol, of which the most desirable specific gravity for this purpose has been found to be from about 0.880 to 0.885 at 15° C. Petroleum fractions having a specific gravity of approximately 0.700 to 0.780 at 15° C. may also be successfully treated in accordance with the present invention. Another important characteristic feature of the invention resides in the fact that various hydrocarbons, such as commercial benzol and suitable petroleum fractions may be treated independently from each other with sulfuric acid or other suitable bodies and then neutralized in accordance with the present invention by means of suitable agents whose use does not involve the presence or formation of hydroxyl ions in the neutralizing solutions; after which the separately treated benzol and petroleum fractions are mixed with each other, the resultant mixture being used as motor fuel of especially desirable characteristics.

The following is an example for carrying my invention into practice:

When applying the same to commercial benzol, 2 to 5 parts by weight of fuming sulfuric acid, containing 10% free $SO_3$, are added to 100 parts by weight of benzol. After the liquid has been thoroughly stirred, the same is allowed to settle for about 12 hours, whereafter the deposits formed are removed. To the liquid there are now added 4 to 10 parts by weight of an aqueous solution or suspension of chemical pure bicarbonate of soda. The mass is thoroughly stirred and settling allowed for approximately 12 hours, whereafter the deposits are removed. The most suitable temperature at which bicarbonate of soda may be added to the aqueous solution is 15° C.

When applying this process to mineral oils, e. g. petroleum fractions, shale oils, etc., ½ to 2 parts by weight of fuming sulfuric acid, containing 10% free $SO_3$, are added to 100 parts by weight of one of the said hydrocarbons. After the liquid has been thoroughly stirred, the same is allowed to settle for approximately 12 hours, whereafter the deposit formed is removed. To the liquid there are now added 1 to 2 parts by weight of an aqueous solution or suspension of pure bicarbonate of soda. The mass is thoroughly stirred and settling allowed for approximately 12 hours. After that the precipitation formed is removed. The most suitable temperature at which bicarbonate of soda may be added to the aqueous solution, is 15° C.

In both cases the concentration of the neutralizing mixture of bicarbonate of soda is 1 part by weight of bicarbonate of soda to 3 parts by weight of water.

The so treated hydrocarbons may be mixed with each other in approximately equal quantities, after which the mass is stirred and caused to settle until a clear liquid has been obtained.

Experiments have proved that by using in explosion motors or other combustion engines the so treated fuel, a certain economy and a greater capacity is obtained than could be had by the use of petrol.

Claims:

1. The process of manufacturing fuel for explosion motors or other combustion engines which comprises subjecting a suitable liquid hydrocarbon or liquid mixture of hydrocarbons to the action of sulfuric acid, and then treating with a soluble neutralizing agent which does not produce hydroxyl ions in solution.

2. The process of manufacturing fuel for explosion motors or other combustion engines which comprises subjecting a suitable liquid hydrocarbon or liquid hydrocarbons to the action of sulfuric acid, and then neutralizing with a mixture of bicarbonate of soda and water.

3. The process of manufacturing fuel for explosion motors or other combustion engines which comprises subjecting a suitable liquid hydrocarbon or liquid mixture of hydrocarbons to the action of sulfuric acid, and neutralizing with a mixture containing substantially one part by weight of chemically pure bicarbonate of soda to 3 parts by weight of water.

4. The process of manufacturing fuel for explosion motors or other combustion engines which comprises subjecting a suitable liquid hydrocarbon or liquid mixture of hydrocarbons to the action of sulfuric acid and then treating with a mixture of water and pure bicarbonate of soda at normal temperature.

In testimony whereof I hereunto affix my signature.

H. W. KNOTTENBELT.